United States Patent [19]
Razin

[11] Patent Number: 6,125,377
[45] Date of Patent: *Sep. 26, 2000

[54] METHOD AND APPARATUS FOR PROOFREADING A DOCUMENT USING A COMPUTER SYSTEM WHICH DETECTS INCONSISTENCIES IN STYLE

[75] Inventor: Ely Y Razin, Jerusalem, Israel

[73] Assignee: Expert Ease Development, Ltd., Jerusalem, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/617,260

[22] Filed: Mar. 18, 1996

[51] Int. Cl.[7] .................................................. G06F 17/21
[52] U.S. Cl. ............................................. 707/531; 704/10
[58] Field of Search ..................................... 707/530, 531, 707/532, 533, 540; 704/2, 4, 5, 6, 9, 10

[56] References Cited

U.S. PATENT DOCUMENTS

| | | | |
|---|---|---|---|
| 5,485,372 | 1/1996 | Golding et al. | 704/9 |
| 5,576,955 | 11/1996 | Newbold et al. | 707/533 |
| 5,598,518 | 1/1997 | Saito | 707/531 |
| 5,678,053 | 10/1997 | Anderson | 707/531 |

*Primary Examiner*—Stephen S. Hong
*Attorney, Agent, or Firm*—Jay H. Maioli

[57] ABSTRACT

A computer system for proofreading a document in electronic form performs the steps of: identifying elements of the document; interpreting elements of the document; creating known element objects; linking related known elements; and comparing known elements and linked objects to identify inconsistencies in the document. Further, the computer system for proofreading a document has an output device for supplying an identification of the identified inconsistencies.

3 Claims, 3 Drawing Sheets

METHOD AND APPARATUS FOR PROOFREADING A DOCUMENT USING A COMPUTER SYSTEM WHICH DETECTS INCONSISTENCIES IN STYLE

BACKGROUND OF THE INVENTION

The central problem addressed by this invention is the identification of the structure and significant units of text within an unknown, user document. This problem is complicated by an inability to pre-designate any firm, conclusive rules as to the use of any particular style at a given location in the document and further by the possibility of inconsistent structures and style usage within the same document.

Problems related and auxiliary to this central problem include: the identification and learning of user structuring styles; the identification of the relationship among numbered units of text that may be either nested or parallel and otherwise unrelated; the identification of additional, functional components within the text that function to conceptually link structural document components or pieces of text; the proofreading of document elements once they have been deciphered.

SUMMARY OF THE INVENTION

The subject invention relates to a method for proofreading a document which comprises the steps of: identifying elements of a document; interpreting elements of the document; creating known element objects; linking related known elements; and comparing known elements, thereby proofreading a document. Further, the subject invention relates to a computer system.

DETAILED DESCRIPTION OF THE PREFERRED EMBODIMENTS

Figure 1:
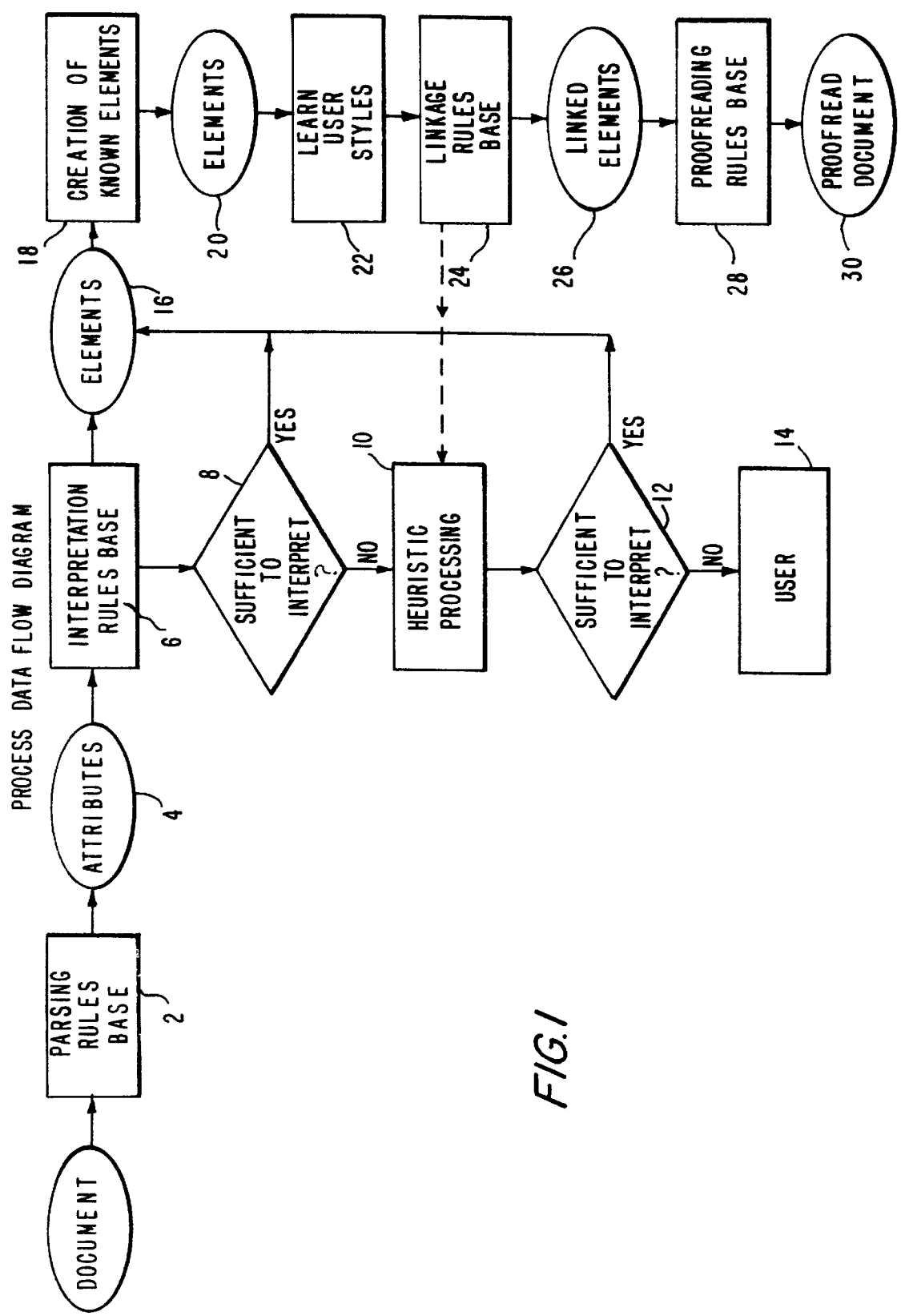
FIG. 1: Process data flow diagram of a process of proofreading a document in accordance with the present invention.

This invention relates to a method for proofreading a document which comprise the steps of: identifying elements of a document; interpreting elements of the document; creating known element objects; linking related known elements; and comparing known elements, thereby proofreading a document.

In one embodiment of the subject invention wherein elements of the document are identified the method further comprises the step of identifying attributes of the document.

In one embodiment of the subject invention wherein elements of the document are interpreted the method further comprises the step of interpreting the document based on simple rules. In another embodiment of the subject invention wherein elements of the document are interpreted the method further comprises the step of interpreting the document based on a weighted rule base. In another embodiment of the subject invention the method further comprises the steps of interpretation of the document base on a heuristic rule base. In another embodiment of the subject invention the method further comprises the steps of interpreting the document based on a user guide.

In one embodiment of the subject invention wherein elements of the document are created the method further comprises the steps of deconstruction of the document.

In the subject application "additional significant style" is defined as a designation of a series of attributes found to be attached to occurrences of a particular type of known element. Each such style is determined by the association of these attributes with the known element in a number of occurrences that exceeds a pre-determined minimum number or proportion of occurrences of that known element. "Attribute" is defined as a category label associated with a word. "Conform" is defined as the process of editing an approximate phrase to correspond to its matching master phrase, or vice versa, retaining the grammatical structure of the source phrase as much as possible. "Document" is defined as any form of expression representable in the form of a sequence of characters (eg, a manuscript or a computer program). "Domain" is defined as a particular field of discourse having its own specialized terminology and types of documents, eg, law, software engineering, etc, "Embedded numeration" is defined as a pair of numbered phrases N and N', such that the numbered sequence of words in N' occurs as a subsequence of the numbered sequence of words in N. N' is embedded in N. "Functional element" is defined as a word, or sequence of words, in a document that serve a unified functional purpose in the document, independent of the words' individual meanings. In a particular domain, different types of functional element will exist. For example, in the domain of legal documents, one type of functional element is the "defined term", corresponding to usage of a term defined elsewhere in the document "Global style" is defined as a designation of that series of attributes to be attached to each occurrence of a particular type of known element. The Global Style is determined by the association of these attributes with the known element in a number of occurrences that exceeds a pre-determined minimum number or proportion of occurrences of that known element "Known element" is defined as a component of a document that is known to the invention and is found to possess certain attributes. "Lexical attribute" is defined as an attribute indicating if a particular word has independent meaning, or if its meaning is only in its grammatical function. "Phrasing" is defined as any part of a document conveying meaning, consisting of one or more words. "Semantic attribute" is defined as an attribute categorizing a sequence of words according to its meaning. For example, "Ab Def Inc." may be categorized as a "company name". Semantic categories may be organized in a hierarchy, with higher-level categories including many lower-level categories; a word is considered to have all semantic attributes whose categories it is included in. Note that in contradistinction to lexical attributes, semantic attributes may apply to sequences of several words. "Structural component is defined as a section of a document, a word, or sequence of words, in a document that serves a structural purpose in the document, independent of the word's individual meanings. Structural Components are domain independent, serving overall to sub-divide, structure and organize the phrasing contained in the document. "Syntactic attribute" is defined as an attribute giving a word's syntactic function. For example, in English text, this may be as simple as a part-of-speech label ("noun", "verb", etc.) or a more complex descriptor based on the word's relationship to other surrounding words.

In addition, the present invention relates to a computer system for proofreading a document, comprising a computer containing an executable proofreading document program in which such program imparts conforming functionality to the computer by changing the state of the computers logic unit upon execution. In another embodiment the computer program is stored on the computer hardware, software or in RAM. In the preferred embodiment the computer program is the process of proofreading a document as described herein.

In addition, the present invention relates to a computer system for proofreading a document, comprising: a. a display; b. a memory; c. a microprocessor; d. a storage; e. an input circuit; and f. an output circuit.

Figure 2:
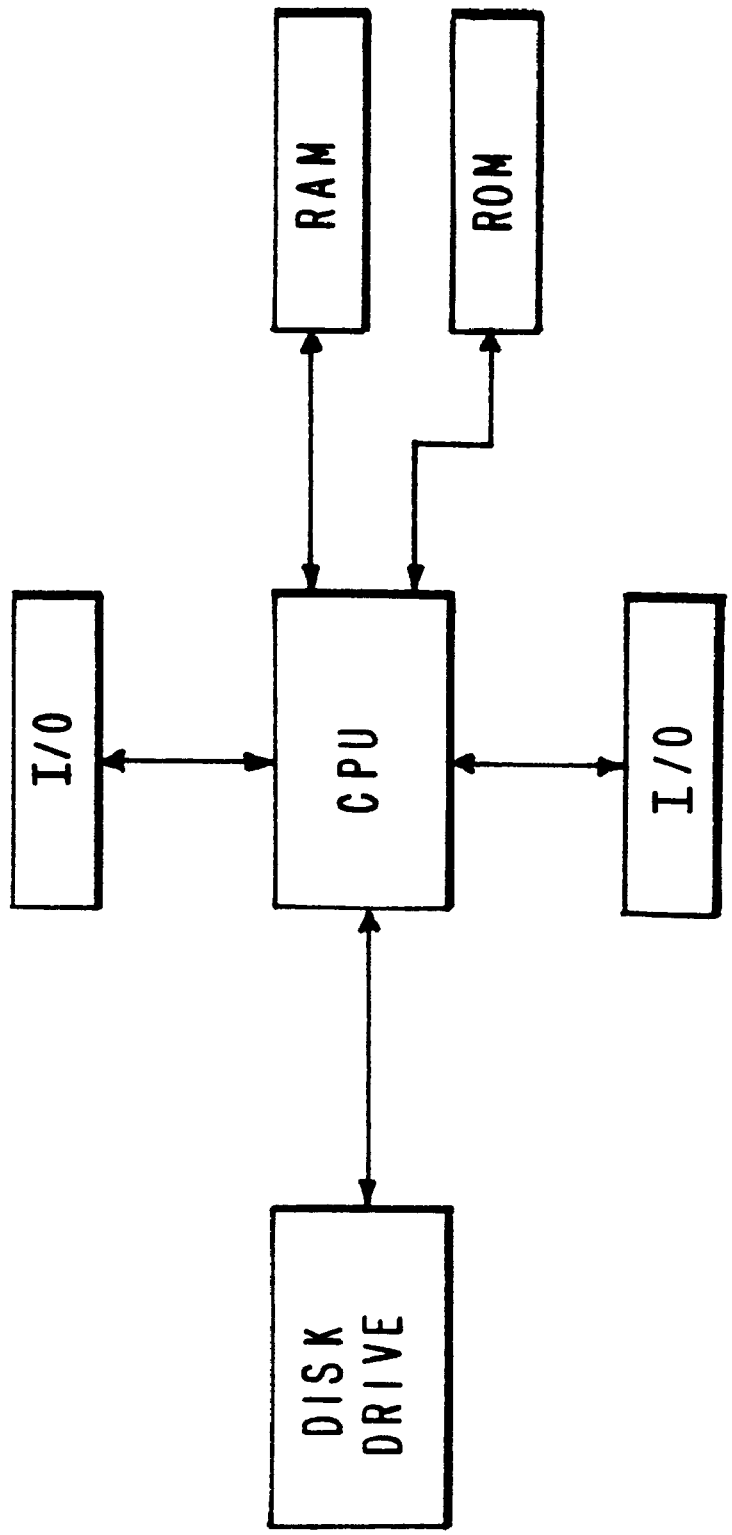
FIG. 2: Block diagram of a system for practicing a method for proofreading a document in electronic form in accordance with the present invention.

In one embodiment the computer system is shown in FIG. 2. In one embodiment the microprocessor includes inter alia the arithmatic logic unit. In one embodiment of the subject application the input means is a modem, mouse, keyboard, stylus and tablet, joystick, microphone, modem, direct memory access, pen, or voice command. Input means are known to those skilled in the art which permit a user to input. In one embodiment of the subject invention the output means is an output device such as a display, a printer and sound modem. Output means are known to those skilled in the art. In one embodiment a display is a CRT or monitor. In another embodiment the memory is RAM, ROM, PROM, EPRO, EEPROM program memory or data memory. In one embodiment the storage is a hard disk, floppy disk, optical disk, or tape.

Further, the sotware or hardware may be implemented in conjunction with any of a number of operating systems, including but not limited to: DOS, Windows, UNIX, etc.

As shown in FIG. 1 the first step, Unknown Element Parsing 2, is centered around the identification of the pertinent attributes of the text. Attribute identification 4 involves the rules-based gathering of certain attributes of units of text. This rules base, termed the "Parsing Rules Base," parses text in order to determine its attributes, as detailed below. Each attribute alone, or in tandem with other attributes, is used in the next step as a basis for identifying the nature and possible significance of these units of text. Only those units of text meeting a sufficient number of the criteria required by this rules base are deemed candidate Unknown Elements, deserving of additional analysis and interpretation in the next step.

The second step, Unknown Element Interpretation, involves the determination of the structural or functional nature of each Unknown Element. This is accomplished via any one of three steps.

The first step involves analysis with reference to an additional rules base, termed the "Interpretation Rules Base 6." If, in the event of excessive ambiguity, the Interpretation Rules Base does not suffice, heuristic processing 10 is used to enable confirmation. If heuristic processing does not suffice to resolve ambiguity, the user may be requested to input additional information to guide the interpretation.

The third step, Creation of Known Elements 18, involves the creation of a series of objects of various types from the formerly Unknown Elements. Each such object is termed a Known Element. Each individual object possesses the attributes specific to it in the text, even though the standard attributes possessed by objects of that type or the specific attributes possessed by other objects of the same type may differ. These differences are resolved in the sixth step detailed below, the Comparison of Known Elements.

Figure 3:
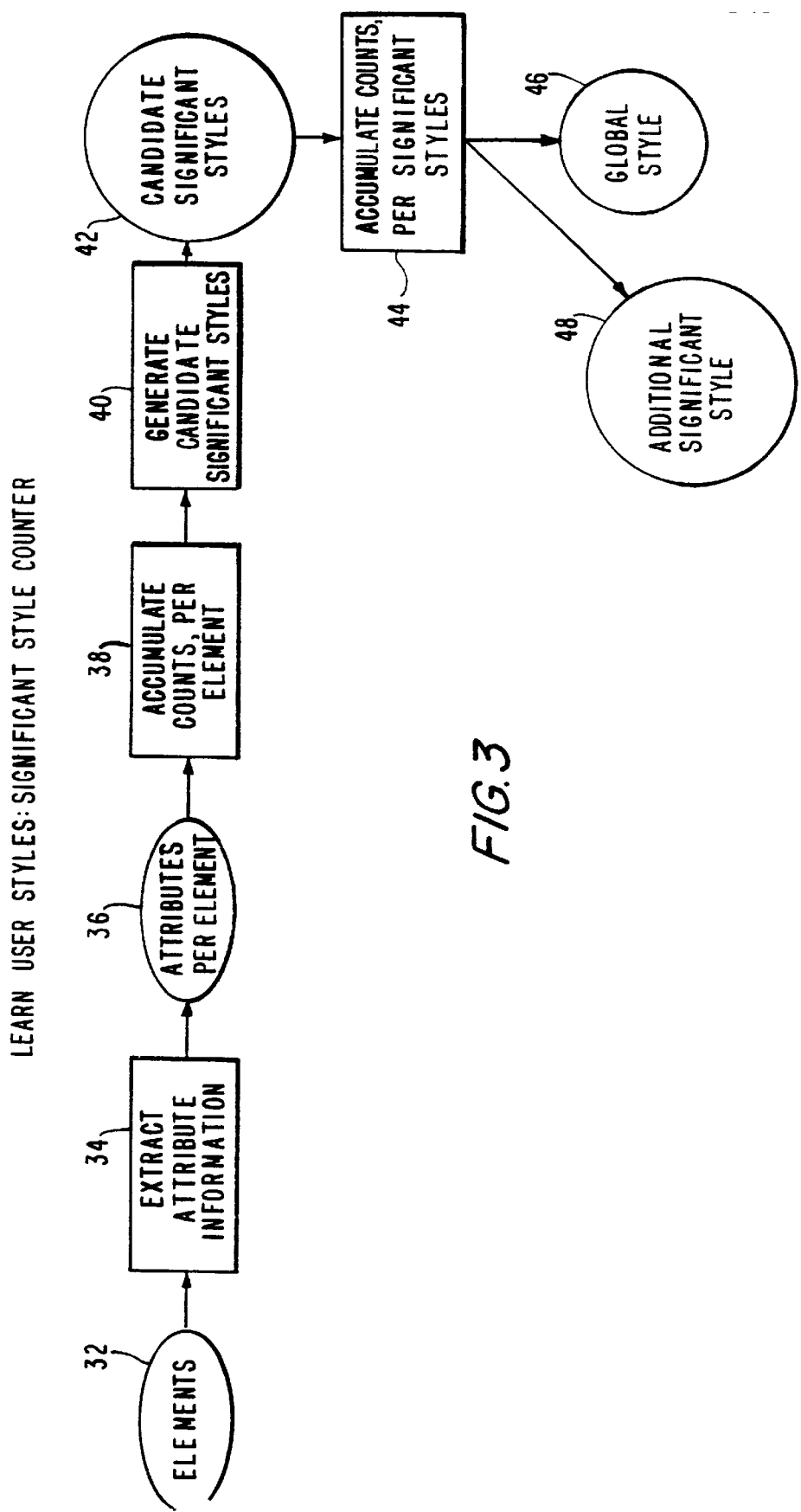
FIG. 3: Process data flow diagram of a significant style counter in accordance with the present invention.

The fourth step, Significant Style Counts (FIG. 3), involves the incrementation of a counter for each type of Known Element in order to determine the standard attributes associated with it. In the event that several different sets of attributes are used a significant number of times, several parallel counts of significant styles may be kept. One of these significant styles for each Element may be deemed the overridingly significant style, termed the "Global Style" 46, while the remainder may be retained as otherwise significant styles 48.

The fifth step, Linkage of Related Known Elements 22, rests on an additional rules base, the "Linkage Rules Base," that instructs the invention which Known Elements to link and where to link them. The insertion of these links allows several things, including comparison of Known Elements to one another, as in the sixth step below, as well as movement directly among linked Known Elements.

The sixth step is Comparison of Known Elements, a further rules based process. These steps, based on the "Proofreading Rules Base, 28" guide the invention as to where and in what ways to compare Known Elements. Essentially, this Rules Base examines Known Elements for several things, including: the presence of attributes that differ from the style(s) used in other occurrences of that type of Known Element; the presence or absence of linkages where the Linkage Rules Base mandates the presence of linked elements; and the presence of two or more Elements of a specific type that are either duplicative of, or substantively inconsistent with, other similar Known Elements. To resolve inconsistency in any of these events, the invention may make its own, rules-based determination or may request user input.

Upon the completion of this process, the invention has deconstructed the document into its structural components, has located any functional components that conceptually link different elements of the document, and has linked all related elements. Finally, it has proofread the document, noting inconsistencies among linked elements, enabling any inconsistencies to be remedied either by application of a further rules base or by user instruction.

The present invention addresses several problems associated with analysis of unknown, user-idosyncratic documents. The central problem is the identification and proofreading of the structure, associated significant units of text, and other, functional units of text within the document. This problem is complicated by an inability to pre-designate any firm, conclusive rules as to the use of any particular style at a given location in the document and a resultant need to extract user structuring styles. This is further complicated by the possibility of inconsistent user structures and styles within the same document.

For the purposes of this description, the following sample document is assumed. All of the examples discussed below relate to the issues posed by this document, including both its titles and its numbering styles the pieces of text associate with these numbers, as provided in these examples:

Document

1. Sub-Title 1. The text reads as follows: (a) this is the first section, (b) this is the second section including the following sub-sections (i) the first sub-section, (ii) the second sub-section and (iii) the third sub-section, and (c) this is the third sub-section.
2. Sub-Title 2. This text is ambiguously numbered (a) the first section and (b) the second section (i) a section with an ambiguous relationship to the preceding numbering series and (ii) a second entry in that numbering series.
3. Sub-Title 3. This text is numbered (a) the first section and (b) the second section (i) a new, unseen numbering style, (ii) second in that series and (iii) third in that series, and (c) this is the third sub-section, including a cross-reference, as stated in Section 1(a).

B. Parsing

Unknown Element Parsing involves a rules-based review of a pre-existing document in order to identify preliminarily relevant attributes of the text. The analysis of the document is conducted by way of applying a body of rules, termed the "Parsing Rules Base," to aid in the parsing of the document and the gathering of detailed attribute information. The Parsing Rules Base includes rules that relate to four types of attributes of a piece of text, including length attributes, textual significance attributes, format attributes and ancillary attributes. Each of these is further detailed below. These rules may include both rules that are independent of the domain of knowledge to which the document relates, as well as other, domain-specific rules that may enhance the accuracy of the parsing. The individual rules or groups of rules to be applied to the text under consideration may vary with the position in the document, the successful location of specific text attributes, and other factors. Where the application of the parsing rules base to the attribute-possessing text preliminary indicates the text to be a potential Known Element, the analysis of the text is continued by way of the Unknown Element Interpretation steps included in the second step.

Length attributes refer to the word count, line count or character count of the unit of text under analysis.

Textual significance attributes indicate the substantive significance of a unit of text in a document. These attributes include semantic attributes, lexical attributes, and functional attributes. Semantic attributes are those attributes that categorize a word or sequence of words according to their meaning. Semantic categorization of terms involves the include, for example, types of documents, types of laws, types of entity, and other categories that may transcend domains of knowledge or that vary from one domain of knowledge to another. A further type of semantic categorization is synonym sets, in which different terms are considered to have the same meaning. Lexical attributes refer to the lexical significance of words, i.e. the determination as to whether a word has meaning independent of its grammatical function. Functional attributes refers to the functional significance of a word or sequence of words within a document, i.e. the determination of whether a term carries functional meaning in addition to any semantic or lexical significance.

Format attributes relate to the visual formatting attached to a unit of text. These attributes include style attributes, spacing attributes, and capitalization attributes. Style attributes refer to the font style and other formatting of the text and any "white space" contiguous to such text. Spacing attributes refer to the justification of the text, the insertion of tabs in the text and the insertion of other "white space" contiguous to the text Capitalization attributes refer to the capitalization of part or all of the text.

Ancillary attributes relate to characters contiguous to, but not an integral part of, a unit of text and include non-letter attributes, punctuation attributes and numeration attributes. Non-letter attributes refer to the presence of characters that are neither letters, numbers nor sentence punctuation that serve functional purpose within the document. Punctuation attributes refer to the presence of significant punctuation beside the text. Numeration attributes refer to the attachment of numbers to pieces of text and the numeration styles of these numbers.

Assume the sample text provided above, with the title as follows:

"Document"

Further assume the Parsing Rules Base only requires the assembly of text formatting attributes if the position of the text (P) is the first page and the length of the text ($L_{text}$) before any paragraph break is sufficiently short to be potentially indicative of a title, where:

$L_{text} \leq 4$ words

As the aforementioned text possesses this attribute, the Parsing Rules Base will continue to gather the attributes of the text, as follows:

Format Attributes (F)=Bolding and Underlining
Capitalization Attributes (C)=All Capitals
Justification Attributes (J)=Centered C. Interpretation The second step, termed Unknown Element Interpretation, may involve three separate components, comprising rules based analysis, heuristic processing, and user interface. First, as above, the Interpretation Rules Base may include both rules that are independent of the domain of knowledge to which the document relates, as well as other, domain-specific rules that may enhance the accuracy of the parsing. The individual rules or groups of rules to be applied to the text under consideration may vary with the position in the document, the successful location of specific text attributes, and other factors. The function of these rules is to interpret the assembled attributes of the text and thereby to determine the nature of the units of text, i.e., the Unknown Elements, possessed of these attributes.

1. Simple Rules Based Interpretation

Assume the sample text provided above, with attributes as follows:

P=Page 1
$L_{text} < 4$ words
F=Bolding, Underlining
C=All Capitals
J=Justification Attributes Assume the Interpretation Rules Base sets the following interpretation rule.

If:
P=Page 1
$L_{text} < 6$ words
AND
F=Bolding OR Underlining OR Italicization
AND
C=All Capitals
OR
J=Centered
THEN
Text=Title As the aforementioned text possesses four of these five attributes, it is determined by the Interpretation Rules Base to be a title.

2. Weighted Rules Based Interpretation

The accuracy of the rules-based interpretation may be heightened by the use of weighting of rules. This weighting may enable the rules to more accurately analyze the structure of the text, as the weights reflect the probabilities associated with occurrence and significance of various text attributes. The weighting of rules may enable the invention to interpret certain otherwise-ambiguous text without further resort to the user in several situations. The significance of weighted rules-based decision making is made clear by the following example with respect to the determination of the nature of ambiguous text:

Assume the sample text, with the title as follows:
"Document"
Further, assume the Interpretation Rules Base contains a two-tiered rules structure, where the first tier contains two rules that must be met to qualify as a title, while the second tier contains the following weighted interpretation rules structure:

Tier 1
If:
  P=Page 1
  $L_{text}$<6 words
THEN: Tier 2
ELSE: End
Tier 2

| F = | Bolding (2) |
| --- | --- |
|  | Underlining (2) |
|  | Italicization (1) |
| C = | All Capitals (10) |
|  | Initial Capitals (4) |
| J = | Centered (1) |

IF:
  $F+C+J \geq 7$
THEN: TITLE
ELSE:
IF:
  $F+C+J \leq 3$
THEN: END
ELSE: ASK USER In the context of the aforementioned example, the following would result:
Simple Rules Base:
If:
  P=Page 1
  $L_{text}$<6 words
AND
  F=Bolding OR Underlining OR Italicization
AND
  C=All Capitals
OR
  J=Centered
THEN:
  Text=Title
As the word:
"Document"
lacks the necessary Capitalization attribute and Justification attribute, it would not be considered a title under the Simple Rules Base.

Interpreted by the more complex Weighted Rules Base, the following results:
Weighted Rules Base
Tier 1
Since:
  P=Page 1
  $L_{text}$<6 words
THEN: Go To Tier 2
Tier 2
Since

| F = | Bolding = 2 |
| --- | --- |
|  | Underlining = 2 |
| C = | Initial Capitals = 4 |

Since
  F+C+J=8>7
THEN. TITLE

Otherwise stated, as: F+C+J=8, the Text is Interpreted as a Title

Whether weighted or not, if this rules-based analysis suffices to determine the nature of this text, the nature of the Unknown Element is determined. The attributes associated with the now-interpreted Known Element are accumulated for the purpose of establishing standard styles per type of Element. At this point, the third component step, the Creation of Known Elements, is commenced.

3. Heuristic-Based Interpretation

Where the nature of a unit of text is ambiguous in that the text complies only in part with the rules, or in that the attributes fail to indicate which rules group to apply, the rules based analysis may not suffice to enable the determination of the nature of a piece of text. In this case, heuristic processing is applied. Heuristic processing involves the interpretation of the text under analysis in the context of the Global Style and other significant styles determined in the fourth step, following, rather than the Interpretation Rules Base. The interpretation of text in light of the significant styles and Global Style extracted for each Known Element enhances the efficiency of the invention and the ability thereof to resolve ambiguity without resort to further user input. As noted below, significant styles and a Global Style may be learned not only on a per-document basis, but also on an overall user basis. Styles used by the user in other documents may form the basis for interpreting ambiguous information in the document currently under analysis.

In the absence of heuristic processing, the invention would only be able to ensure accurate interpretation of this ambiguously-attributed unit of text by requesting further user input. Heuristic processing enables the invention to interpret certain ambiguous text without further resort to the user in several situations. The significance of heuristic processing is made clear by the following discussion of two examples. The first example below relates to a case where the text complies only in part with the rules. The second example below relates to a case where the text's attributes fail to indicate which rules group to apply.

The first example presents a situation similar to the above, where the document title, however, is ambiguous as it possesses only the following format attributes:
Title
Document According to either the Simple Rules Base or the Weighted Rules Base, each described above, this word would not be interpreted as a title. Assume that the Significant Style Counter described in the fourth step below extracted the user significant style described by the following rule:
Heuristic
If:
  P=Page 1
  $L_{text}$<6 words
AND
  C=Initial Capitals
AND
  Other Sub-Titles are found to have neither:
  Bolding
  Underlining
  Italicizing
THEN:
Text=Title
Assume the following interpretation by the heuristic:
  P=Page 1

$L_{text}$<6 words
C=Initial Capitals

Other Sub-Titles are found to have no Bolding, Underlining nor Italicizing.

As a result, this text is interpreted to be a title.

The second case, in which the attributes fail to indicate which rules group to apply, is illustrated by the following example from the sample document provided earlier in this application:

Document

1. Sub-Title 1. The text reads as follows: (a) this is the first section, (b) this is the second section including the following sub-sections (i) the first sub-section, (ii) the second sub-section and (iii) the third sub-section, and (c) this is the third sub-section.
2. Sub-Title 2. This text is ambiguously numbered (a) the first section and (b) the second section (i) a section with an ambiguous relationship to the preceding numbering series and (ii) a second entry in that numbering series.
3. Sub-Title 3. This text is numbered (a) the first section and (b) the second section (i) a new, unseen numbering style, (ii) second in that series and (iii) third in that series, and (c) this is the third sub-section, including a cross-reference, as stated in Section 1(a).

Following a review of these 3 numbered paragraphs, five things become clear:
1. There are 2 styles of numbering the first at the beginning of the paragraph and the second embedded within the paragraph ("Embedded Numeration").
2. There are several possible instances of Embedded Numeration series within any paragraph.
3. The Embedded Numeration may be either embedded in increasingly lower levels or embedded in parallel to other instances of numeration.
4. Paragraphs 1 and 3 are consistent in their numbering styles, in that both use two Embedded Numeration styles: (a, b, c) (i, ii, iii), and further in that the second numbering style (i, ii, iii) is embedded in a lower level than the first numbering style (a, b, c).
5. Paragraph 2 is ambiguous in its numbering style, in that the first Embedded Numeration style (a, b) does not clearly embed the second Embedded Numeration style (i, ii). It is therefore not clear whether sections (i, ii) are embedded within section (b) or whether they are parallel to numbering series (a, b).

Assume that, through the Significant Style Counter, the invention learns the following user Global Style, including the learned relationship among different series of numeration:

| Global Style: | First Embedded Numeration Style: a, b, c |
| --- | --- |
| | Second Embedded Numeration Style: i, ii, iii |
| | AND |
| | Second Embedded Numeration is further embedded in First Embedded Numeration |

In the absence of this learned Global Style and relationship, the Interpretation Rules Base is unable to deduce the relationship between the two series of Embedded Numeration and can only ensure accuracy of interpretation by requesting further user input. However, heuristic processing expands the efficiency of the invention, as it enables the invention to make determinations without further user input. In particular, as above, where the numbering styles have been used unambilguously in other locations in the document, the invention may apply the relationship learned from these other locations to the current ambiguous location. In the sample paragraph above, even though the numbering of paragraph 2 is ambiguous when considered on its own, the learned Global Style helps resolve the ambiguity.

To further illustrate the power and efficiency gains enabled by this heuristic processing, consider the following sample paragraph once again:
2. Sub-Title 2. This text is ambiguously numbered (a) the first section and (b) the second section (i) a section with an ambiguous relationship to the preceding numbering series and (ii) a second entry in that numbering series.

Further, assume that, through the Significant Style Counter, the invention learns the following user Global Style, immediately below, and the Additional Significant Style, further below, including the learned relationships among different series of numeration:

| Global Style: | First Embedded Numeration Style: a, b, c |
| --- | --- |
| | Second Embedded Numeration Style: x, y, z |
| | AND |
| | Second Embedded Numeration is further embedded in First Embedded Numeration |

Embedded Numeration

In the absence of these learned styles, the Interpretation Rules Base is unable to deduce the relationship between the two series of Embedded Numeration and can only ensure accuracy of interpretation by requesting further user input. While heuristic processing expands the efficiency of the invention, as it enables the invention to make certain determinations without further user input, it does not assist in determination of the sample paragraph above, as the Global Style differs from that used in this paragraph. Absent any additional heuristic processing, the invention, again, can only ensure accuracy of interpretation by requesting further user input Assume, however, that in addition to the Global Style noted above, the Significant Style Counter learns that the user has an additional significant style, though it appears less than the Global Style. The further power enabled by the learned Additional Significant Style, which follows, further allows the invention to make accurate determinations without requiring user input.

| Additional Significant Style: | First Embedded Numeration Style: a, b, c |
| --- | --- |
| | Second Embedded Numeration Style: i, ii, iii |
| | AND |
| | Second Embedded Numeration is further embedded in First Embedded Numeration |

As noted above, paragraph 2 is ambiguously numbered. Neither the Interpretation Rules Base nor the Global Style heuristic processing is sufficient to resolve this ambiguity. However, the learned Additional Significant Style further expands the efficiency of the invention, as it enables the invention to make determinations without further user input. In particular, as above, where the numbering style has been used both ambiguously and inconsistently with other locations in the document, relationships learned by the Significant Style Counter may help determine the interpretation of ambiguous information.

4. User-Guided Interpretation

If this heuristic processing suffices to determine the nature of this text, the nature of the Unknown Element is determined and the third component step, the Creation of Known Elements, is commenced. Where neither the rules base nor heuristics suffice to guide the invention to determine the nature of the text under analysis, it requests additional input from the user to enable it to make a determination as to the nature of the Unknown Element. Upon the user's enabling input of the nature of the text, the nature of the Unknown Element is determined and the third component step, the Creation of Known Elements, is commenced.

D. Document De-Construction/Known Element Object Construction

The third step involves the Creation of Known Element objects. Following the aforementioned determination of the nature of the Unknown Element, the third step, in which the Unknown Element is converted into one of a variety of known types of objects, termed a Known Element, takes place. The types of Known Elements into which the Unknown Elements are converted are detailed below. Essentially, the result of this third step is the analysis and deconstruction of the document into its structural components, detailed below This analysis enables the invention to take its next step, the analysis of the distinctive, user styles and formats associated with each of these components and the abstraction and establishment of the document's overriding styles and formats. The basis for the determination of these styles and formats are those attributes gathered in the Unknown Element Parsing for each Known Element.

1. Structural Component Elements

Consider again the example of the title interpreted through the simple Interpretation Rules Base, in the second step above: "Document"

The attributes associated with the Known Element, Document Title, are therefore as follows:

P=Page 1

$L_{text}$<4 words

F=Bolding, Underlining

C=Initial Capitals

J=Centered

The structural components into which the document is broken down include the following overall document parts: Title Page; Table of Contents and other document Indexes; and the Body of the Document.

The Body of the Document is further deconstructed into the following sub-components of the document: Document Title; Sections and Sub-Sections, whether numbered, bulleted or plain text; The relationship among Document Tiers, including Nested Sections and Sub-Sections; Section Sub-Titles; Numeration and Bulleting; and Structural Punctuation and Conjunctions.

To further illustrate this deconstruction, consider the sample paragraph 2 as above, including the following Global Style:

Document

2. Sub-Title 2. This text is ambiguously numbered (a) the first section and (b) the second section (i) a section with an ambiguous relationship to the preceding numbering series and (ii) a second entry in that numbering series.

| Global Style: | First Embedded Numeration Style: a, b, c |
| --- | --- |
| | Second Embedded Numeration Style: i, ii, iii |
| | AND |
| | Second Embedded Numeration is further embedded in First Embedded Numeration |

The following Known Elements characterize paragraph 2.

Known Element No. 1:

| Sections: | <2. Sub-Title 2. This text is ambiguously numbered . . . that numbering series.> |
| --- | --- |
| Section Attributes: | Sub-Titled. |
| | Spacing: 0 |
| | Justification: Left |
| | Length: 39 Words |
| Global Style: | First Embedded Numeration Style: a, b, c |
| | Second Embedded Numeration Style: i, ii, iii |
| | AND |
| | Second Embedded Numeration is further embedded in First Embedded Numeration |
| Numbering Style: | <Arabic Numeral> |
| | Structural Punctuation: <.> |

Known Element No. 2

| Section Sub-Title: | Sub-Title 2. |
| --- | --- |
| Sub-Title Attributes: | F = Underlining |
| | C = Initial Capitals |
| | Structural Punctuation: <.> |
| | Structural Conjunction: None. |

Known Element No. 3 and 4

| Sub-Sections: | <Sub-Section 1: (a) the first section and> |
| --- | --- |
| | <Sub-Section 2: (b) the second section (i) a section . . . that numbering series.> |
| Sub-Section Attributes: | No Sub-Title. |
| | Numbering Style: <a, b, c> |
| | Structural Punctuation: None. |
| | Structural Conjunction: <and> |

Known Elements No. 5 and 6

| Sub-Sub-Sections: | <Sub-Sub-Section 1: (i) a section with an ambiguous . . . series and> |
| --- | --- |
| | <Sub-Sub-Section 2: (ii) a second entry in that numbering series. > |
| Sub-Sub-Section Attributes: | No Sub-Titles |
| | Numbering Style: <i, ii, iii> |
| | Structural Punctuation: None. |
| | Structural Conjunction: <and> |

2. Functional Component Elements

Certain functional components of the document are also identified and extracted through the application of a further rules base, the "Functional component Rules Base." These include acronyms and defined terms, along with their associated definitions. In addition, the invention extracts other functional components that serve to inter-link structural components of the document, including cross-references to Sections and Sub-sections, as well as to other documents.

Consider the sample cross-reference included in the sample Section 3, above:

3. Sub-Title 3. This text is numbered (a) the first section and (b) the second section (i) a new, unseen numbering style, (ii) second in that series and (iii) third in that series, and (c) this is the third sub-section, including a cross-reference, as stated in Section 1(a), (italics inserted)

The italicized phrase has significance apart from its simple lexical significance, as it functions to inter-link two portions of the document. As a result of this inter-linkage, Section 3 now has an expanded semantic meaning; it now includes not only the terms expressly included in Section 3, but also the terms of Section 1(a), incorporated by reference. This significance, termed "functional significance" makes the italicized phrase an additional, important structural component of the document.

E. Learning User Styles

The fourth step involves the establishment of standard styles. This establishment is accomplished through the Significant Style Counter, which increments a counter for each type of Known Element in order to determine the standard attributes associated with it. As several different sets of attributes may be used throughout a document in association with any one type of Known Element, several parallel counts may be kept for each type of Known Element. Further, as each type of Known Element may exist in different Document Tiers, the varying style used for each type of Known Element in each different Document Tier is further tracked separately. Additionally distinct counts may be kept for Known Elements appearing in different positions or sub-components in a document.

In any such case, where this incrementation results in a count higher than a threshold for a signficant style, a candidate for standard style is generated for the Known Element in the particular Document Tier and document structural component in which the Known Element appears. These steps are oriented not to finding definitive Element-wide styles (i.e., for the particular Document Tier and position), but rather only candidate significant styles. These candidates are significant in two ways. First, they are deserving of further analysis to determine whether they are the over-riding Element-wide style, termed the "Global Style," for the particular Known Element. Second, whether or not they are the Global Style, each candidate style is, by definition, a significant user style, evidenced by its exceeding the threshold number of occurrences for significance, $O_{min}$; as a result, any of these significant styles may have been used by the user on elements of the same type and can be used to resolve ambiguities in Unknown Element Interpretation, as above.

The candidates for "Global Style" must be further analyzed to determine which of these styles qualifies as the "Global Style" to which all other numbering styles must ultimately conform. Where the number of occurrences of significant style x, $N_x$, exceeds a minimum $N_{min}$, that candidate style is designated the "Global Style." The remainder of the styles may be designated Additional Significant Styles.

F. Linkage

The fifth step involves the linkage of related Known Elements. A further rules base, the "Linkage Rules Base," instructs the invention which Known Elements to link and where to link them. Linkages are generally inserted in order to account for three types of relationship. The first, "parent-child," exists where one element is the source element referenced by a referencing functional component. Linkage of the referencing element to the source element concretizes the implicitly referencing relationship among the two elements; an electronic link is inserted to reflect the conceptual link indicated by the reference. "Parent-Child" links include the links of a defined term to its definition; a section reference to its referenced section; a cross-document reference to the other document.

The second, "sibling-sibling," exists where two elements are of the same type. In this case, linkage reflects not a relationship of referencing, but rather a relationship of commonality of certain attributes. Two Known Elements of the same type share certain significant attributes and the linkage reflects that. "Sibling-sibling" links include the links of one section to another; of one sub-title to another; of one defined term to another; of one cross-reference to another; etc.

The third, "twin," is a sub-set of the "sibling-sibling" relationship. It exists where two elements are not only of the same type, but include the identical text. In this case, not only certain attributes, but rather all attributes are shared. "Twin" links include the links of one instance of a defined term to another instance of the same defined term; of one cross-reference to a section to a second cross-reference to the same section; etc.

In any of these cases, the insertion of these links allows several things, including comparison of Known Elements to one another, as in the sixth step below, as well as movement directly among linked Known Elements.

G. Proofreading

The sixth step is Comparison of Known Elements, a further rules based process. These steps, based on the "Proofreading Rules Base," guide the invention as to where and in what ways to compare Known Elements. Essentially, this Rules Base examines Known Elements for several things. First, the Proofreading Rules Base seeks the presence or absence of linkages among "parent-child" Elements; all child elements must be linked to their parent elements. In addition, certain parent elements must be linked to a child element, e.g. a definition must be linked to a usage of a defined term, while other parent elements may validly exist without linkage to a child element, e g. a section need not be referenced to be valid. If these links are absent, an error exists. Second, the Proofreading Rules Base seeks the presence of common attributes among both sibling-sibling" elements and "twin" elements. As their relationship is defined by the commonality of certain attributes, the absence of some or all of these common features is an error. Third, the Proofreading Rules Base seeks duplication or substantive inconsistency among "twin" parent elements. Where these inconsistencies exist, an error may exist, though the duplication or inconsistency may be intentional. To resolve these inconsistencies, the invention may make its own, rules-based determination or may request user input.

Upon the completion of this process, the invention has deconstructed the document into its structural components, has located any functional components that conceptually link different elements of the document, and has linked all related elements. In addition, it has proofread the document, noting inconsistencies among linked elements, enabling any inconsistencies to be remedied either by application of a further rules base or by user instruction. This information may be used to enable automatic replacement of inconsistent styles with consistent styles, to prevent the insertion of substantively inconsistent components, to enable conforming of changes between Known Elements of a given type, and to enable presentation of indexes of Known Elements to the user. Each of these uses of the Known Element information relies on further "rules bases" to instruct the invention when and how to replace or prevent insertion of inconsistent styles, when to conform changes and how to organize the information for presentation to the user, respectively.

What is claimed is:

1. A method for proofreading a document in electronic form using a computer system, which comprises the steps of:

identifying attributes of the document by parsing the document using a parsing rules database of the computer system;

interpreting the identified attributes of the document using an interpretation rules database of the computer system to identify elements of the document, wherein the interpretation rules database includes domain-independent and domain-specific rules;

creating known element objects in the computer system using the identified elements;

linking related ones of the known element objects using a linkage rules database of the computer system; and comparing the known element objects and linked objects using a proofreading rules database of the computer system to identify semantic inconsistencies in the document.

2. An apparatus for proofreading a document in electronic form, comprising:

attribute identification means for identifying attributes of the document by parsing the document;

element identification means for identifying elements of the document using domain-independent and domain-specific rules according to the attributes identified by said attribute identification means;

style determination means for determining, as significant styles, attributes that are present in at least a predetermined number of the elements identified by said element identification means;

element linkage means for linking related ones of the elements identified by said element identification means, including linking similarly styled elements which share at least one significant style; and inconsistency identification means for comparing the elements and linked elements to identify semantic inconsistencies in the document.

3. A computer system for proofreading a document in electronic form, comprising:

a. attribute identification means for identifying attributes of the document by parsing the document;

b. element identification means for interpreting using domain-independent and domain-specific rules the attributes of the document identified by said attribute identification means and for identifying elements of the document according to the interpretation of the attributes;

c. object creation means for creating known element objects using the elements identified by said element identification means;

d. element linkage means for linking related ones of the known element objects created by said object creation means;

e. object comparison means for comparing the known element objects and linked objects to identify semantic inconsistencies in the document; and f. output means for outputting an identification of the semantic inconsistencies identified by said object comparison means.

* * * * *